United States Patent [19]
Fussell et al.

[11] Patent Number: 5,426,476
[45] Date of Patent: Jun. 20, 1995

[54] AIRCRAFT VIDEO CAMERA MOUNT

[76] Inventors: James C. Fussell, 44 Anderson Dr.;
Kenneth E. Fussell, 539 Holly Dr.,
both of Eufala, Ala. 36027

[21] Appl. No.: 341,158

[22] Filed: Nov. 16, 1994

[51] Int. Cl.[6] .................................................. G03B 39/00
[52] U.S. Cl. ......................................................... 354/74
[58] Field of Search ........................... 354/74, 81, 293;
352/243; 348/143, 144, 145, 146, 147

[56] References Cited

U.S. PATENT DOCUMENTS

| | | | |
|---|---|---|---|
| 4,736,218 | 4/1988 | Kutman | 354/81 |
| 4,752,791 | 6/1988 | Allred | 354/81 |
| 4,825,232 | 4/1989 | Howdle | 354/81 X |
| 4,920,367 | 4/1990 | Pagano | 354/81 |
| 4,945,367 | 7/1990 | Blackshear | 354/81 |
| 5,028,997 | 7/1991 | Elberbaum | 348/143 |
| 5,093,677 | 3/1992 | McMahon | 354/74 |
| 5,121,215 | 6/1992 | Boers et al. | 354/81 X |
| 5,153,623 | 10/1992 | Bouvier | 354/81 |
| 5,159,368 | 10/1992 | Zemlin | 354/81 |
| 5,223,872 | 6/1993 | Stiepel et al. | 354/81 |
| 5,231,435 | 7/1993 | Blakely | 354/74 |
| 5,289,091 | 2/1994 | Wada | 354/81 X |
| 5,365,291 | 11/1994 | Moleda | 354/74 |

FOREIGN PATENT DOCUMENTS

| | | |
|---|---|---|
| 850369 | 9/1970 | Canada . |
| 63-65431 | 3/1988 | Japan . |

Primary Examiner—Howard B. Blankenship
Attorney, Agent, or Firm—Richard C. Litman

[57] ABSTRACT

An aircraft video camera mount provides for the removable, temporary attachment of a video camera and associated tilt and pan mechanisms to the upper end of the wing strut of a high wing airplane, or alternatively to a suitable strut of another aircraft type. The strut attachment bracket secures around the strut at one end, and may bolt through the strut at the opposite end using the existing wing tiedown bolt hole normally provided through the wing strut. The camera tilt, pan, and focal length are remotely operated by an operator in the aircraft. Both the electrical power and the operating systems for the camera are preferably portable and self contained, so they may be easily removed and quickly installed in the aircraft as the need arises, thus precluding need for FAA approvals for use of the existing aircraft electrical or other systems to operate the present camera system. The device is particularly suited to news operations where a dedicated aircraft is not available at all times, and/or where the additional expense of specialized aircraft (e.g., helicopters and blimps) is not justified. With the present device, an existing fixed wing aircraft may be used for charter or other operations when not needed for aerial video photography, due to the ease and quickness of installation and removal of the present camera equipment.

20 Claims, 7 Drawing Sheets

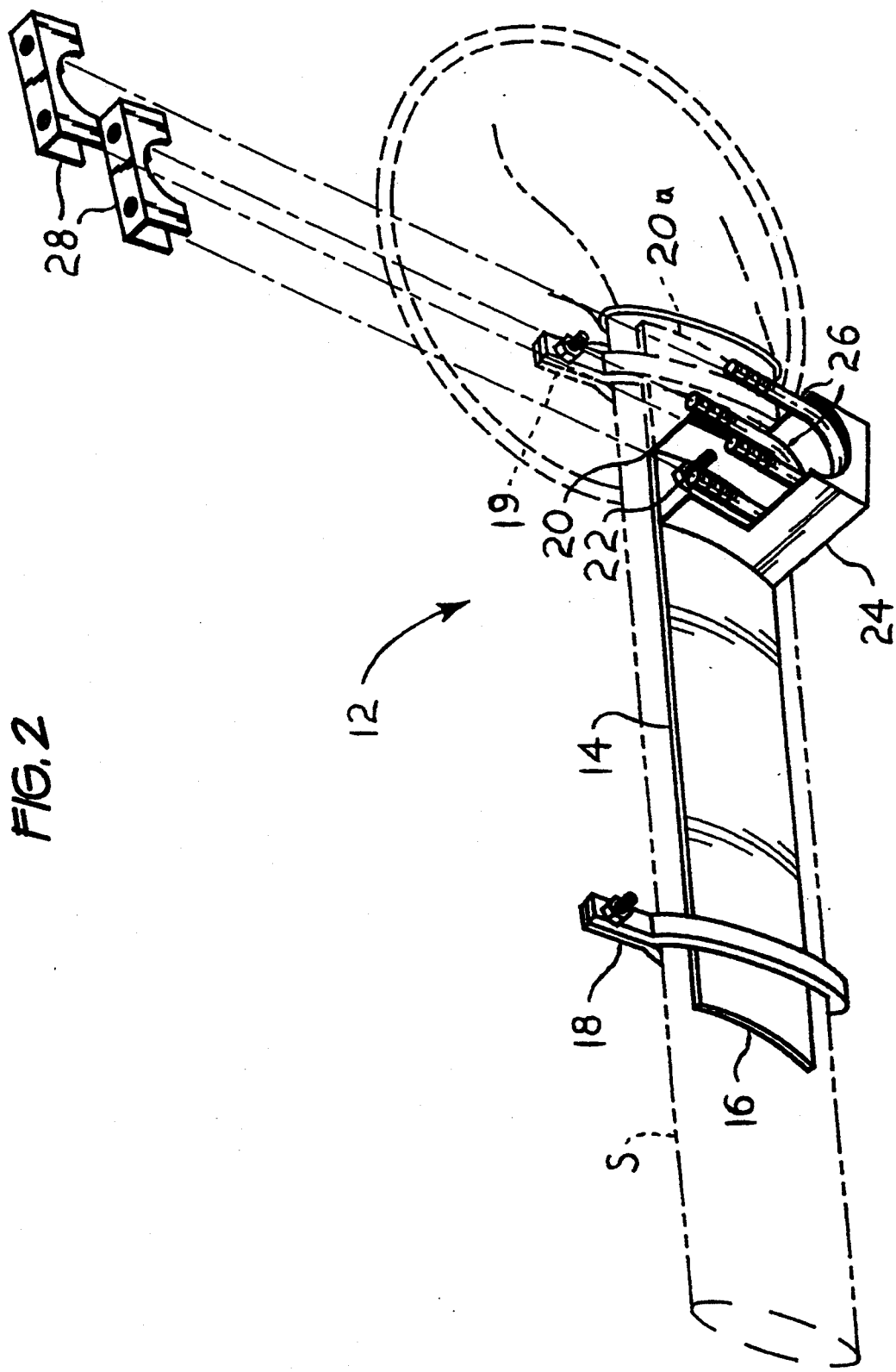

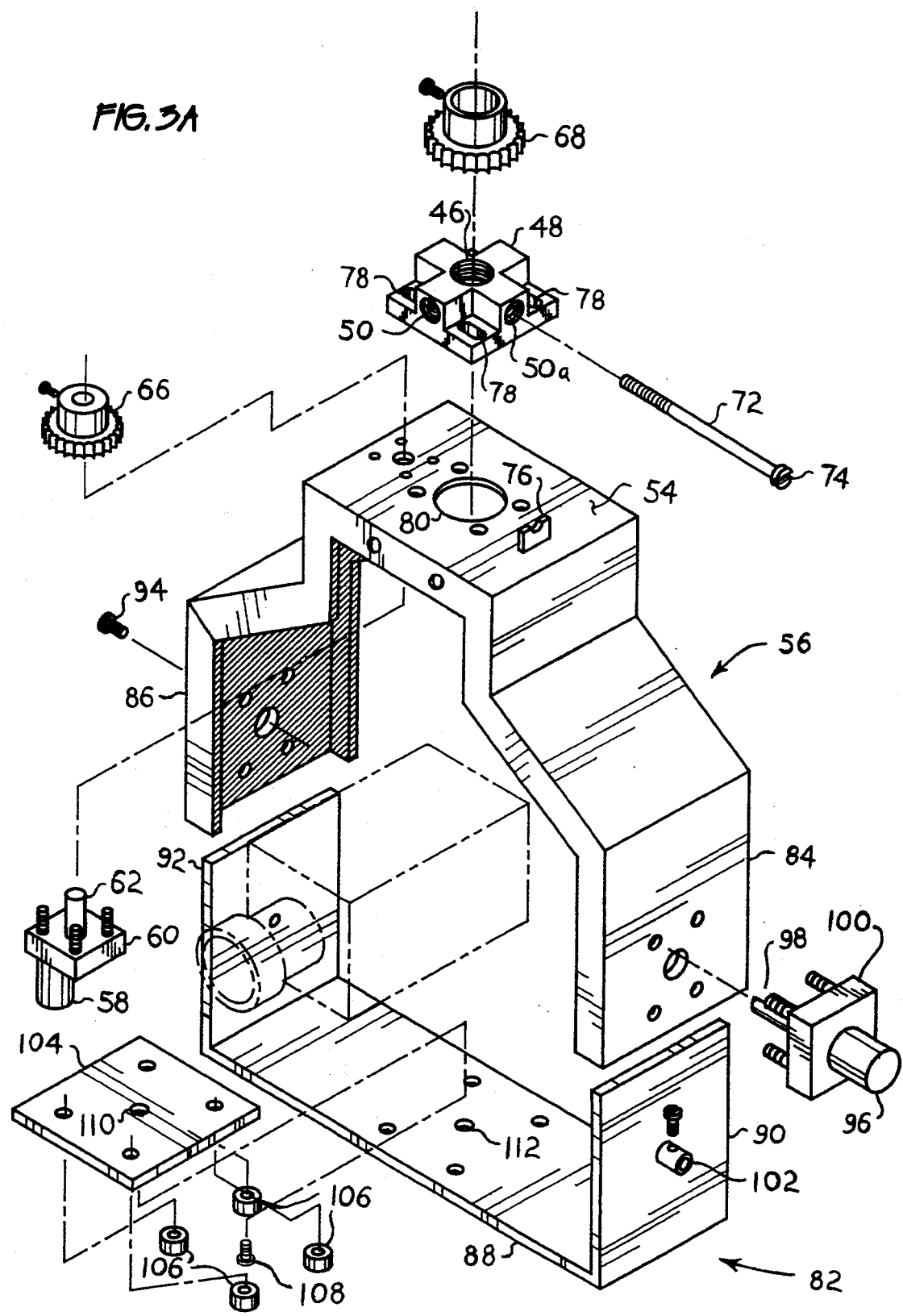

AIRCRAFT VIDEO CAMERA MOUNT

FIELD OF THE INVENTION

The present invention relates generally to aerial photography, and more specifically to a remotely controlled video camera mount which is attachable to an aircraft strut, particularly the wing strut of a strut braced, high wing airplane. Movement of the camera is controllable by an operator in the airplane.

BACKGROUND OF THE INVENTION

From the earliest days of aviation, the advantages of an airborne observation platform have been recognized. As the video news media (particularly television) developed, it was quickly realized that aerial photography of news and other events provided significant advantages over ground based coverage. Generally, the news or other media is able to get clear, unobstructed shots of the object of attention when using aerial photography, as opposed to having to work around other news personnel and/or authorities, etc. In addition, the overall plan view provided from above, is often advantageous in enabling persons to better visualize the situation, than is a ground based viewpoint. Accordingly, aerial coverage of news and sports events, etc., has become increasingly popular.

However, such aerial coverage comes at a price. In the past, relatively slow aircraft (i.e., helicopters and blimps) were desired as aerial camera platforms by the media, due to their relatively slow airspeeds and their ability to linger over a given area on the ground, whereas a fixed wing aircraft must remain in motion through the air in order to keep flying. Thus, the use of helicopters and lighter than air aircraft (blimps) is seen as more desirable by the media. However, due to the size and/or complexity of such specialized aircraft, their operating costs are several times those of fixed wing aircraft, which discourages their use by smaller operations. Moreover, their availability is generally limited, requiring considerable planning for the use of such specialized aircraft for aerial video or photography use. Obviously, it may not be possible to make arrangements for the use of such specialized aircraft for coverage of a fast breaking news event, thus limiting the coverage of the event to the ground. Moreover, lighter than air aircraft are particularly subject to wind conditions, and high winds can result in blimps and the like being unable to fly, thus cancelling planned coverage of a sporting event or the like, and potentially costing the media a considerable sum in the loss of sponsorship money. Most, if not all, of the above problems could be overcome with suitable equipment adapted specifically for use with a light, fixed wing aircraft.

Accordingly, the need arises for a video camera mount which is adaptable for use with a strut braced, high wing airplane, in the event that another type of aircraft (helicopter, etc.) is not available. The camera should be remotely controlled by an operator within the aircraft, in order to provide optimum tilt, pan, and resolution of the scene being photographed or recorded. Maximum independence of all systems is desirable, in order to preclude need to tie in to existing aircraft systems and the resulting time and paperwork required for FAA approval. Moreover, the device should be relatively inexpensive to procure and to operate, in comparison with other related devices, in order to enable smaller concerns to operate the device economically, while still being able to provide quality aerial video photography.

DESCRIPTION OF THE PRIOR ART

U.S. Pat. No. 4,736,218 issued to Arkady Kutman on Apr. 5, 1988 discloses a Camera Support And Housing generally resembling the present invention, but differing importantly in that the support is from a post mounted directly below the housing. Hence, the camera cannot be tilted for a view directly downward, due to the supporting post and associated mechanical apparatus within the housing. The Kutman device is intended for ground use and remote surveillance of an area, and thus no directly vertically downward operation is required. On the other hand, the present invention must provide for vertically downward viewing on occasion, and is accordingly mounted to an aircraft attach point directly above the housing and apparatus. The Kutman device includes ventilation means disposed at the top of the housing, precluding attachment at that point to another structure. The ventilation means are required, due to the relatively long periods of mechanical inattention given the device, whereas the present camera mount is not intended to be left unattended for long periods.

U.S. Pat. No. 4,752,791 issued to Charles N. Allred on Jun. 21, 1988 discloses a Camera Mount adapted primarily to helicopter use. A generally rectangular frame is secured to the aircraft, with gimbaled horizontal and vertical axes provided for the camera mount. Even though the Allred device is suspended from above, due to the vertical gimbal the camera cannot be tilted vertically downward, as in the present invention. The lack of a housing or enclosure exposes the camera and operating mechanism to the effects of wind, rain, airborne dirt and dust, insects, etc., unlike the protected mechanism of the present camera mount.

U.S. Pat. No. 4,825,232 issued to William J. Howdle on Apr. 25, 1989 discloses an Apparatus For Mounting Aerial Survey Camera Under Aircraft Wings, comprising a generally horizontally disposed plate secured to an aircraft wing and strut at each end. The Howdle mount suspends the weight of the camera from between the mount attach points, which results in some bending load being imposed upon the strut at some distance from the strut attach point. The present invention secures the camera from a point essentially directly beneath the aircraft tiedown point, which is provided through the end of the wing strut and which is designed to take a substantial load. Moreover, the Howdle mount requires disassembly of the aircraft structure, in that one end of the mount is secured to the wing spar at the strut attach point by the strut attach bolt through the spar. This requires appropriate paperwork and a signoff by an FAA rated airframe mechanic, as an alteration of the airframe, and limits use of the device to strut braced fixed wing airplanes. The present invention clamps to the strut, but may use the tiedown hole through the strut as the second attachment means, thus precluding any requirement for structural disassembly and the resulting complications involved.

U.S. Pat. No. 4,920,367 issued to Raymond V. Pagano on Apr. 24, 1990 discloses a Ballistic Rated Camera Housing And Method For Forming, comprising a generally spherical shell formed of two hemispheres joined at the horizontal equator of the sphere. A clear window is provided for the camera, but the window extends only 90 degrees from the equator to a point opposite the overhead suspension pole (col. 5, lines 21-23). Thus, the camera would be unable to observe scenes from directly below, as approximately one half of the lens would be blocked by the end of the window at the 90 degree point below the equator. The present invention provides viewing straight down, directly opposite the mounting point. Moreover, the Pagano device is relatively heavy, as it is intended to be resistant to impact from gunfire and the like. The present housing has no such requirement, but in fact must be lightly built in order to save weight in its aviation environment.

U.S. Pat. No. 4,945,367 issued to David M. Blackshear on Jul. 31, 1990 discloses a Surveillance Camera System including a generally spherical housing around a remotely or automatically controllable camera. The Blackshear housing does not need to rotate with the camera, as the entire lower half of the housing is semiopaque, and allows only a limited amount of light to pass. The present housing provides an optically simpler window having only simple curvature in one plane, and being optically clear.

U.S. Pat. No. 5,028,997 issued to David Elberbaum on Jul. 2, 1991 discloses a Television Camera Apparatus including an enclosure therefor. The camera mounting and enclosure are secured to a relatively wide base, rather than to a single shaft extending from the enclosure, as in the present invention. Thus, the Elberbaum device cannot be attached to an aircraft strut, as provided by the present invention. Moreover, the hemispherical curvature of the Elberbaum housing is more difficult to make optically perfect than the flat wrapped window of the present housing, thus increasing the cost and weight of a relatively thick hemispherical sheet of clear plastic or glass.

U.S. Pat. No. 5,093,677 issued to Brian McMahon on Mar. 3, 1992 discloses an Apparatus For Mounting A Remote Controlled, Gyro-Stabilized Camera Externally On A Helicopter. As the abstract indicates, the device is a truss which secures to the attach points for the helicopter cabin steps, and provides for the mounting of a relatively large and heavy camera to the forward end thereof. The truss is specifically configured to attach to a Bell Jetranger or Longranger type helicopter, and is not easily adaptable to other aircraft. The installation of the heavy, gyro-stabilized camera in front of the helicopter results in a requirement for aft ballast to be installed, which could result in an unsafe nose or tail heavy condition if the weight is improperly calculated or installed. The present invention utilizes only a single pre-existing attach point on the aircraft, generally in the lateral plane of the center of gravity of the aircraft. Thus, no forward or rearward ballast need be carried for such mounting. Moreover, the present apparatus is relatively lightweight, being devoid of complexities such as gyro stabilization. Any lateral imbalance caused by the present invention may be easily compensated for, by carrying less fuel in the wing tank to the side of the aircraft carrying the camera.

U.S. Pat. No. 5,121,215 issued to Arie Boers et al. on Jun. 9, 1992 discloses a Surveillance Camera System wherein the camera is suspended from a relatively broad base. The base is intended to replace a standard ceiling tile area, and thus is not adaptable to mounting on a relatively narrow strut of an aircraft, as provided by the present invention. As the horizontal axis of rotation of the camera is generally coplanar with the mounting base, which is installed coplanar with the ceiling, the camera cannot be tilted to a horizontal position, as provided by the present camera mounting system, but is limited to some downward field of view. While the Boers et al. camera can point vertically downward, as in the present invention, the present mount permits the camera to be aimed horizontally also.

U.S. Pat. No. 5,153,623 issued to Bernard Bouvier on Oct. 6, 1992 discloses a Surveillance Camera With Integrated Support, attachable to a flat structure (wall, ceiling) by means of a mounting ring. The camera and housing are intended to look like a spot light or the like, for camouflage purposes. The mounting ring attachment means precludes attachment to a wing or other strut, and the hole at the front of the housing fails to protect the internal camera, lens, and/or mechanism from the elements, as provided for by the housing of the present invention.

U.S. Pat. No. 5,159,368 issued to Karl E. Zemlin on Oct. 27, 1992 discloses an Automatic And Manual Panoramic Camera Mount including limit switches for the reversal of direction of the azimuth or panning platform or table. The result is that the camera is capable of panning through 360 degrees. The present panning mechanism is not limited to 360 degrees and may provide additional rotation if desired, although this is not a primary advantage of the present invention. Zemlin does not disclose any tilt means, housing or enclosure, or mounting means for his camera mount, as provided by the present invention.

U.S. Pat. No. 5,223,872 issued to Norbert M. Stiepel et al. on Jun. 29, 1993 discloses a Surveillance Device With eyeball Assembly And Pivotably Mountable Carriage Assembly. The device includes a generally spherical housing for the camera, which housing is divided into two hemispherical portions, but the housing includes an opening therein for the camera lens. A variety of additional lenses are provided to close the opening in front of the camera lens, which additional lenses are costly to form to provide the optically correct properties required. Moreover the relatively broad mounting plate cannot be adapted to a strut attachment.

U.S. Pat. No. 5,231,435 issued to Bruce W. Blakely on Jul. 27, 1993 discloses an Aerial Camera Mounting Apparatus installable in a window frame of a fixed wing aircraft. No housing is disclosed to protect the camera apparatus from the elements; no remote operating mechanism is disclosed; and finally, no attachment means to a fixed portion of the aircraft structure is disclosed, as provided by the present invention.

U.S. Pat. No. 5,289,091 issued to Jyoji Wada on Feb. 22, 1994 discloses an Apparatus For Turning Monitoring Camera, comprising an automated angular displacement detection means which provides for the reversal of direction of the rotation of the camera when the predetermined limits are reached. The device is primarily adapted to the continual, automatic panning of the camera, rather than to a manually controlled remote camera, as with the present invention. Automated camera panning and reversal is not desired in the present invention, as the objective must be kept in sight by a human operator as the angle between the aircraft and the objective continually varies in a non-liner manner as the aircraft passes and turns around the object.

Canadian Patent No. 850,369 issued to Robert P. Taylor on Sep. 1, 1970 discloses a helicopter Camera Mounting for use with stereoscopic survey cameras. The camera housing is flexibly attached to an I-beam structure, which in turn is suspended from the bottom of the helicopter fuselage. The lack of rigid mounting to a strut, lack of means for tilting and panning the camera(s), and lack of remote control means, all differ from the present camera mount. The present camera system is not intended for survey work, but rather for aerial reconnaissance of newsworthy situations or the like on the ground.

Finally, Japanese Patent No. 63-65431 published on Mar. 24, 1988 discloses stereoscopic aerial survey camera attachment for helicopters. A transverse beam is installed above the fuselage, with another transverse beam suspended therefrom and supporting the camera housing. Another longitudinal beam is also provided. The apparatus is more closely related to that of the Canadian patent discussed above, than to the present invention.

None of the above noted patents, taken either singly or in combination, are seen to disclose the specific arrangement of concepts disclosed by the present invention.

SUMMARY OF THE INVENTION

By the present invention, an improved aircraft video camera mount is disclosed.

Accordingly, one of the objects of the present invention is to provide an improved aircraft video camera mount which attaches to the wing strut of a strut braced, high wing airplane, or alternatively to other strut means of an aircraft, and which requires no structural disassembly or modification to the aircraft.

Another of the objects of the present invention is to provide an improved aircraft video camera mount which provides for the remote panning, tilting and focal length operation of the camera by an operator in the aircraft.

Yet another of the objects of the present invention is to provide an improved aircraft video camera mount which may be easily installable to and removable from the aircraft, to provide further utility for the aircraft for other types of operations.

Still another of the objects of the present invention is to provide an improved aircraft video camera mount which control and power wiring may be installed within the aircraft structure as desired, with the control means and camera means being removable from the aircraft.

A further object of the present invention is to provide an improved aircraft video camera mount which includes a housing for the camera and its operating mechanism, serving to protect the camera and mechanism from the elements.

An additional object of the present invention is to provide an improved aircraft video camera mount which utilizes a single tubular column for the suspension of the camera, actuating mechanism, and housing therefrom, with the camera and housing being rotatably secured thereto by a concentric column.

Another object of the present invention is to provide an improved aircraft video camera mount which provides a flat wrapped, clear lens cover to protect the camera and mechanism and further to provide economy of construction and optical clarity.

Yet another object of the present invention is to provide an improved aircraft video camera mount which provides for tilt operation of the camera at least from the horizontal downwardly through the vertical inclusive, relative to the vertically disposed attachment shaft or column.

A final object of the present invention is to provide an improved aircraft video camera mount for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 2 is a lower rear perspective view of the attachment bracket for the tilt and pan mechanism and housing, showing its attachment to the upper end of an airplane wing strut.

FIG. 3A is an exploded perspective view of the camera mount components of the present invention, showing their relationship.

Similar reference characters denote corresponding features consistently throughout the several figures of the attached drawings.

DETAILED DESCRIPTION OF THE PREFERRED EMBODIMENT

Figure 1:
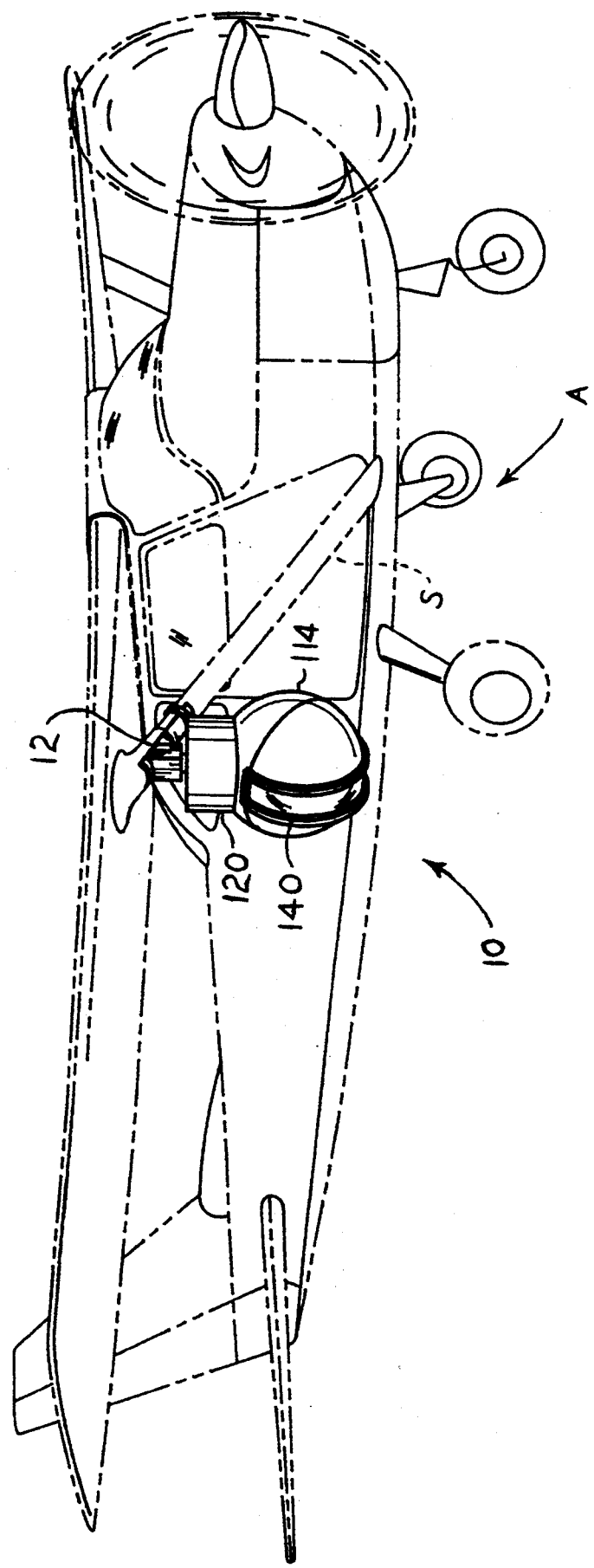
FIG. 1 is a perspective view of the aircraft video camera mount and system of the present invention, installed on a strut braced high wing airplane.

Referring now particularly to FIG. 1 of the drawings, the present invention will be seen to relate to an aircraft video camera mount 10 which is temporarily installable to a strut of an existing aircraft and provides for the remotely controlled horizontal (pan) and vertical (tilt) movement of a camera therein by an operator in the aircraft. In FIG. 1, the video camera mount 10 is shown secured to a wing strut S on a high wing airplane A (e.g., Cessna 172 or 182), but it will be understood that the present aircraft video camera mount 10 may be temporarily installed on virtually any suitable strut (landing gear, etc.) of virtually any type of aircraft, including rotary wing aircraft (helicopters and gyroplanes) if desired. While it is desirable to configure the strut attachment bracket so that the housing depends generally vertically therefrom, which will depend upon the angle of the aircraft strut, this is not absolutely essential as the camera angle is controlled by an operator in the aircraft as desired.

Preferably, the strut attachment bracket assembly 12 is secured immediately adjacent the upper end of the wing strut S when the present invention is temporarily secured to a strut braced airplane, as shown in FIG. 2. Such an attachment location reduces the length of the arm from the attachment bracket 12 to the strut attachment point on the aircraft, and thus reduces the bending moment on the wing strut S. Moreover, the present video camera mount makes advantageous use of any existing aircraft tiedown point which is conventionally located at the upper end of the wing strut S on such aircraft, as will be explained further below.

The strut attachment bracket assembly 12 comprises a strut attachment plate 14, which is preferably curved to closely fit the generally airfoil shaped curvature of the underside of the strut S to which it is secured. The lower end 16 of the strut attachment plate 14 is secured to the strut S by a clamp 18, which secures around the strut attachment plate lower end 16 and the strut S to sandwich the plate lower end 16 between the strut S and the clamp 18. An extended upper end 20a, shown in broken lines, of the strut attachment plate 16 may also be secured to the strut S in a like manner using another clamp 19, shown in broken lines, if desired. This allows the camera platform 10 to be secured closer to the fuselage, if desired, to shorten the electrical leads between the unit and a controller in the fuselage. However, the present invention provides another means of securing the upper end 20 of the plate to a conventional wing strut S, as explained below.

Typically, the upper ends of the wing struts of a high wing, strut braced aircraft A include holes therethrough which have ringed bolts installed therein to provide a tiedown ring for securing the aircraft to the ground, in order to reduce the hazard of wind damage. The present strut attachment bracket assembly 12 makes use of this provision, by removing the existing tiedown bolt (not shown) and passing a bolt 22 through the tiedown bolt hole of the strut S and a cooperating hole through the upper end 20 of the strut attachment plate 14, to secure the upper end 20 of the strut attachment plate 14 to the strut S. The use of the existing tiedown bolt hole to secure the present strut attachment bracket assembly 12 to a strut S, precludes any possibility of the assembly 12 inadvertently slipping longitudinally or laterally relative to the strut S, as might occur using only clamps.

It will be seen that the present strut attachment bracket assembly 12 may be secured to other types of struts, e.g., airplane or helicopter landing gear or skid struts, etc., in the same manner. If a bolt hole is provided through such struts for a step or other purposes, it may be used in the manner described above for the wing strut tiedown hole. Otherwise, two or more clamps 18 and/or 19 may be used, as desired.

Figure 3B:
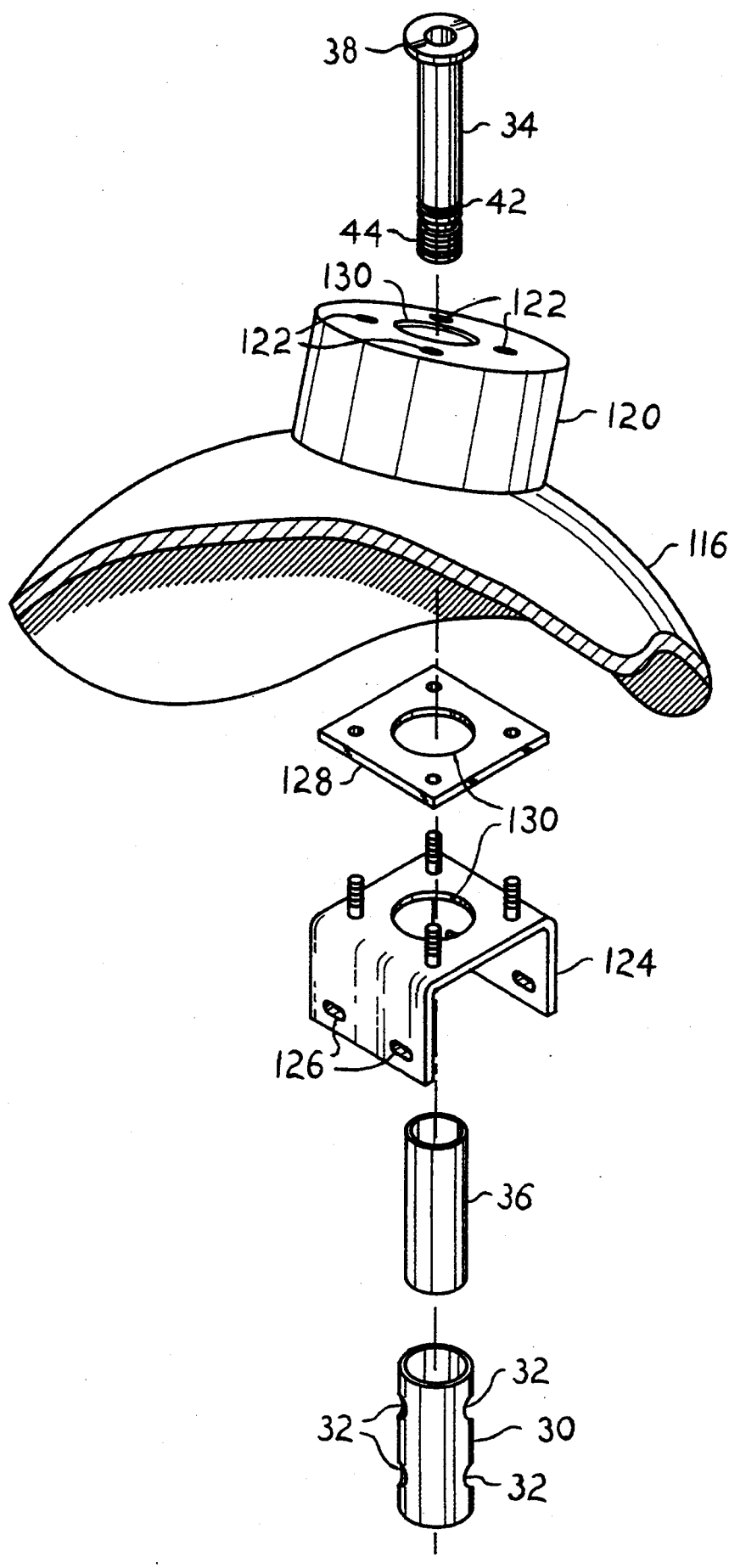
FIG. 3B is an exploded perspective view of the attachment and housing components of the present invention, showing their relationship.

The lower surface of the strut attachment plate 14 includes a shaft attachment channel or bracket 24 welded or otherwise secured thereto and depending generally vertically therefrom, with the channel or bracket 24 including upper and lower generally U-shaped bolts 26 welded or otherwise secured within the channel/bracket 24 and extending generally horizontally and rearwardly therefrom. Two semicircular clamps 28 cooperate respectively with the upper and lower U-bolts 26, to clamp a camera pan drive shaft 30 securely and immovably therein, as shown in the side assembly view in section of FIG. 4 and the exploded view of FIG. 3B and explained below.

The hollow, tubular camera pan drive shaft 30 includes two pairs of oppositely spaced lateral grooves 32 therein, which are captured by the sides of the U-bolts 26 when the pan drive shaft 30 is installed in the bracket assembly 12, thus preventing the pan drive shaft 30 from dropping from the bracket assembly 12. The pan drive shaft 30 serves to support the entire balance of the present video camera platform, by means of a hollow, tubular driven camera bracket support shaft 34 which is installed concentrically to rotate axially within the drive shaft 30; a low friction sleeve bearing 36 (e.g., Teflon, tm or other suitable plastic or other material) may be inserted between the outer, fixed drive shaft 30 and the inner, rotating driven support shaft 34.

The driven support shaft 34 includes a flange 38 extending from its upper end, which supports the driven support shaft 34 (and the remainder of the mechanism supported and driven thereby) and prevents the mechanism from falling from the drive shaft 30. Further security between the two shafts 30 and 34 is provided by a retaining ring 40 (shown in section in FIG. 4) inserted in a groove 42 near the lower end 44 of the driven support shaft 34. The threaded lower end 44 of the driven shaft 34 cooperates with a mating threaded passage 46 through the center of a support shaft receiver plate 48, shown in FIGS. 3A and 4. The receiver plate 48 includes a plurality of threaded radial holes 50 therein, which serve to lock the receiver plate 48 to the lower threaded end 44 of the driven support shaft 34 by means of set screws (cap screws, bolts, etc.) 52 to prevent relative rotation therebetween.

Figure 4:
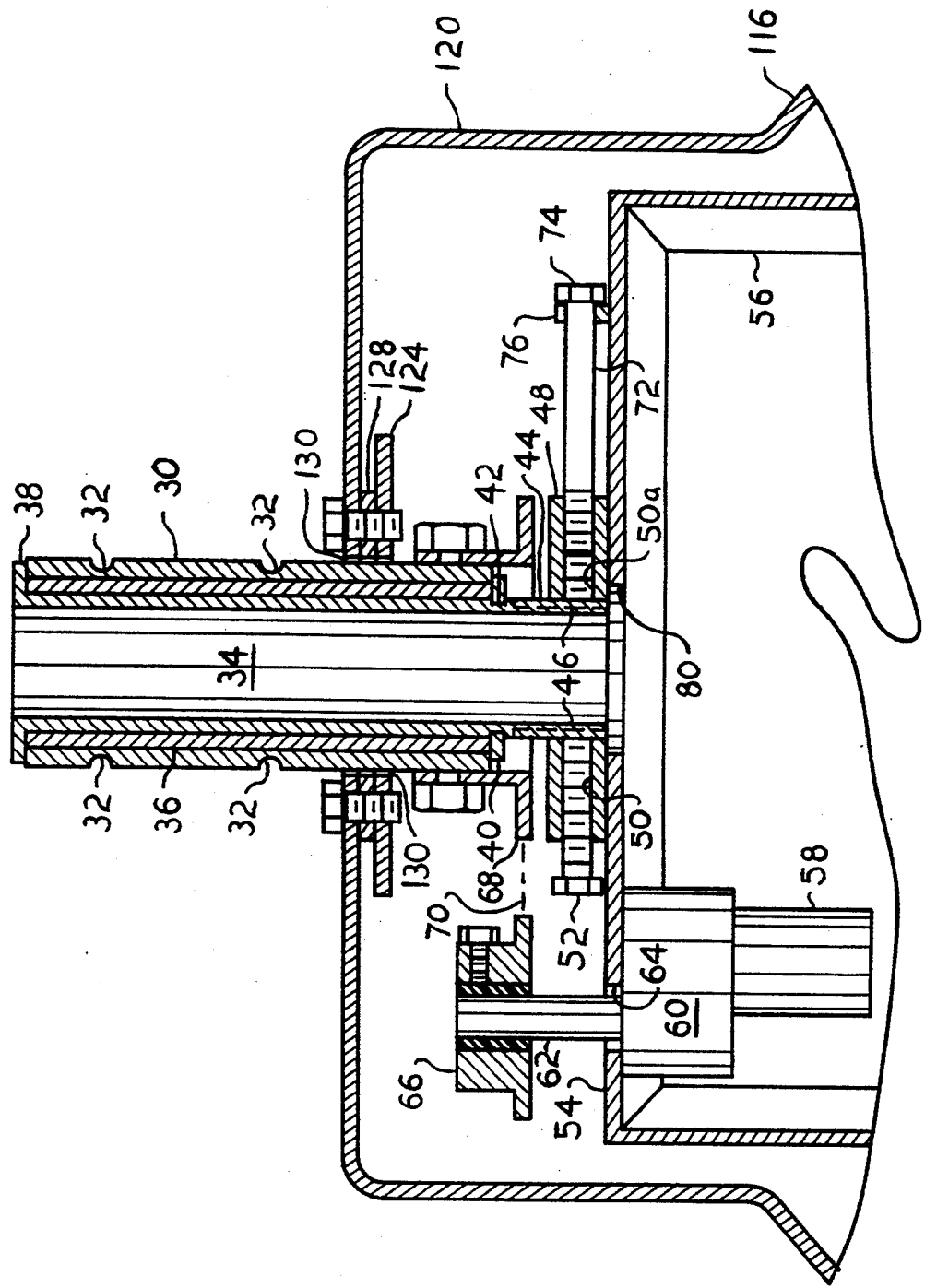
FIG. 4 is a detail elevational view in section, of the upper portion of the upper portion of the camera housing and pan mechanism, showing the relationship of the components.

This receiver 48 is in turn bolted or otherwise affixed to the central platform 54 of a camera pan bracket 56. The pan bracket 56 is motorized by means of an electric pan motor 58 and gear reduction 60, serving to reduce the motor 58 rpm to approximately 4.5 rpm at the output shaft 62; other speeds and reductions may be used as desired. The pan motor 58 and reduction 60 are affixed to the underside of the central platform 54, with the output shaft 62 extending upwardly through a hole 64 in the central platform 54. A sprocket 66 is affixed to the output shaft 62, which sprocket drives a cooperating and preferably larger diameter sprocket 68 affixed to the lower end of the drive shaft 30. A roller chain 70, shown schematically in FIG. 4, is used to transfer rotary motion between the two sprockets 66 and 68. The preferably larger diameter sprocket 68 provides a further reduction in rpm, down to approximately 1.5 rpm. Again, other ratios and speeds may be used.

Operation of the above assembly occurs when the pan motor 58 is electrically activated. (It will be understood that the direction of rotation is reversible, to provide panning or azimuth movement in either direction for the pan bracket 56.) As the pan motor 58 turns the output shaft 62 and motor sprocket 66 by means of the reduction drive 60, the pan drive chain 70 will be turned, causing it to rotate or "walk" around the driven shaft sprocket 68, as it is immovably affixed relative to the drive shaft 30. Thus, the entire assembly comprising the pan motor 58 and its associated reduction drive 60, the camera pan bracket 56 to which the pan motor 58 is affixed, and the driven support shaft 34 which is affixed to the central platform 54 of the camera pan bracket 56 by means of the pan bracket receiver 48, will be caused to rotate as the chain 70 rotates or "walks" around the drive shaft sprocket 68 due to rotation of the motor sprocket 66.

Adjustment is provided for slack in the chain 70 in the above assembly, by means of an adjustment bolt 72 which bolt head 74 is captured by a retainer 76, thereby allowing the bolt 72 to apply tensile force to the receiver plate 48; the bolt 72 is threaded into a passage 50a of the receiver plate 48. As the bolt 72 is tightened, it will draw the receiver 48 toward it as it threadibly advances in the passage 50a, thus drawing tight the chain 70. The receiver 48 is secured to the pan bracket central platform 54 56 by means of a plurality of slotted holes 78, thus allowing for the positional adjustment of the receiver 48 relative to the pan bracket central platform 54. It will be seen in FIG. 4, that the support shaft 34 does not extend downwardly through the central passage 80 of the pan bracket central platform 54; thus, passage 80 is not critical to the repositioning of the receiver plate 48.

The camera pan bracket 56 also provides for the carriage of a camera tilt bracket 82 pivotally attached thereto, by means of spaced apart opposite first and second depending arms 84 and 86 which extend downwardly from the central platform 54 of the pan bracket 56. The tilt bracket 82 comprises a central tilt platform 88 with spaced apart opposite first and second camera tilt platform walls 90 and 92 extending upwardly therefrom. The two walls 90 and 92 are adapted to fit closely between the two depending arms 84 and 86 of the camera pan platform 56, and are pivotally secured therebetween by means of a bolt or pivot pin 94 (associated spacers, hardware, etc. not shown) through the respective second arm 86 and wall 92, and a tilt motor 96 affixed to the first arm 84 of the camera pan platform 56 and driving an output shaft 98 by means of a reduction drive 100, with the output shaft 98 being secured to the first wall 90 of the tilt platform 82 by means of a collar 102 or the like affixed to the tilt platform first wall 90.

The camera pan platform 82 may also include a camera mounting plate 104 secured to the central tilt platform 88 by cushioning or shock absorbing means 106, e.g., the Lord mounts sandwiched between the central tilt platform 88 and the camera mounting plate 104. A video camera V or the like may in turn be secured to the shock mounted camera mounting plate 104, using the conventional tripod mounting means (not shown) for such cameras and a camera attachment screw 108 through a cooperating hole 110 in the camera mounting plate 104. An access hole 112 may be provided through the central tilt platform 88, in order to secure and remove the video camera V without need to remove the camera mounting plate 104 from the central tilt platform 88. A plurality of camera mounting holes may be provided to adapt various cameras to the present invention.

Figure 5:
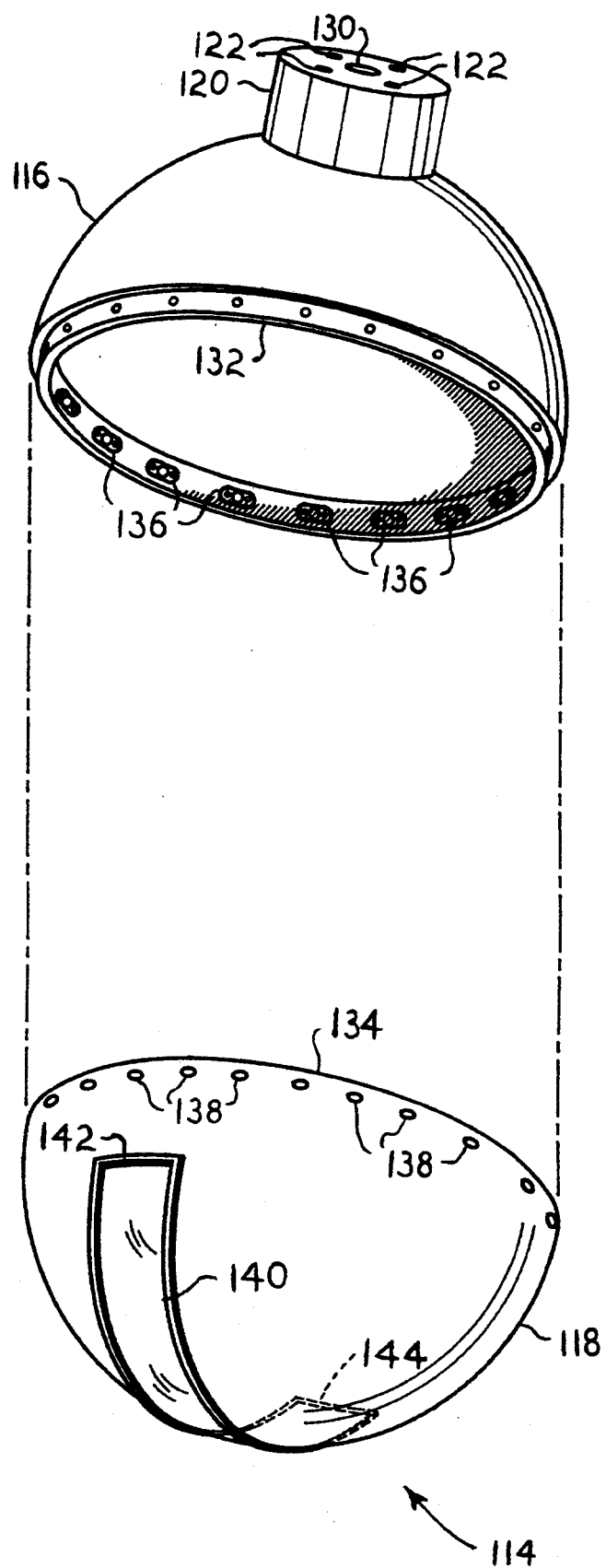
FIG. 5 is an exploded perspective view of the housing, showing its details.
Figure 6:
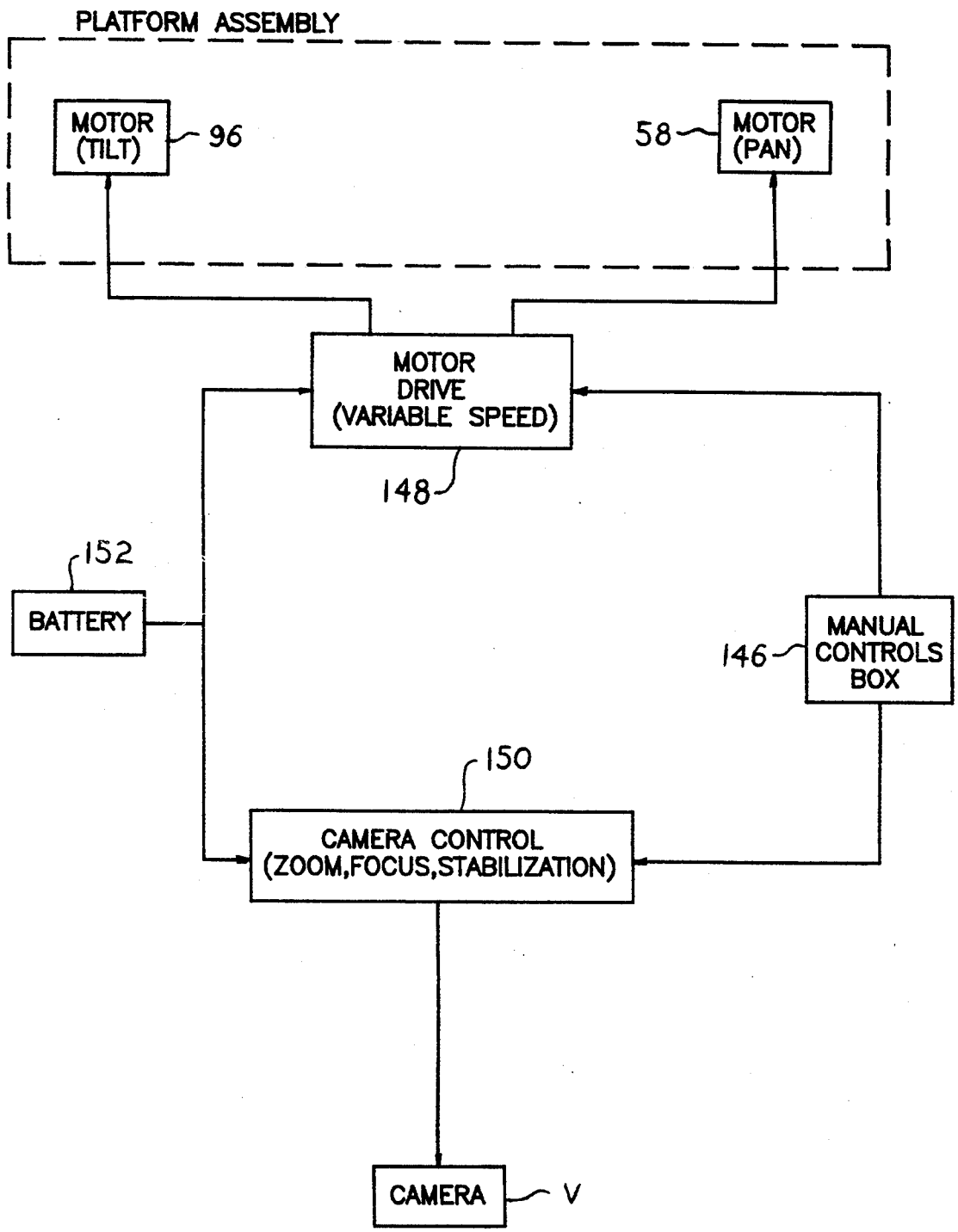
FIG. 6 is a block diagram of the basic components of the present invention and their relationship.

The above described camera pan and camera tilt platform mechanisms and their associated drive means, along with a video camera or the like, are contained within and protected from the elements by a housing 114, shown in its respective upper and lower portions 116 and 118 in FIG. 5. The housing 114 is of generally spherical form, and is preferably constructed of a relatively lightweight and durable material, such as fiber glass or other composite material. The housing upper portion 116 includes a top fairing 120 extending upwardly therefrom, which fairing 120 serves to cover and protect the central pan platform area and its associated pan motor and drive system.

The fairing 120 includes a plurality of housing attachment holes 122 therein, which provide for the attachment of the housing 114 to a pan platform attachment bracket 124 (FIG. 3B), which bracket 124 is in turn secured to the central platform 54 of the pan bracket 56. The platform attachment holes 126 of the housing-pan platform attachment bracket 124 are slotted, in order to allow for repositioning due to the lateral adjustment of the pan drive chain mechanism described above. A spacer 128 may be provided between the top of the attachment bracket 124 and the inside of the top of the fairing 120, if required. The top of the fairing 120, the center of the housing-to-pan attachment bracket 124, and the center of the spacer 128 will each be seen to include a passage 130 therethrough, providing for passage of the outer camera pan drive shaft 30 therethrough. As the attachment bracket 124 is secured to the rotatable camera pan bracket 56, and the housing 114 is secured to the attachment bracket 124 by means of the upper fairing 120, it will be seen that the housing 114 rotates with the camera pan bracket 56, whenever the camera pan motor 58 is actuated.

The lower edge 132 of the housing upper portion 116 is inwardly offset, to fit within the upper edge 134 of the housing lower portion 118. The inside of the upper portion edge 132 includes a plurality of fastener receptacles 136 therearound, preferably being quick release fasteners such as Dzus ( TM ), Camloc ( TM ), or the like. Alternatively, nutplates or other means may be used if desired. Mating holes 138 are provided along the lower portion edge 134, which holes 138 align with the fastener receptacles 136 of the upper portion 116 when the two portions 116 and 118 are assembled together to form a complete housing 114 about the above described mechanism.

The separation line between the upper portion 116 and lower portion 118 of the housing 114, defined respectively by the edges 134 and 132, is not about an equatorial plane, perpendicular to the rotational axis defined by the drive and driven shafts 30 and 34, but is on a circumferential diagonal line preferably inclined at least ten degrees from the equator of the generally spherical housing 114, as shown clearly in FIG. 1. By inclining the separation line, the lower portion 118 may include a camera window 140 therein, which extends from an upper edge 142 some ten degrees or more above the equator downward and around the bottom of the lower portion 118 to a lower edge 144 past the center of the rotational axis of the bottom of the housing 114. As no lower obstruction exists for the camera tilt bracket 82, it will be seen that the present video camera platform 10 provides for the vertical tilt or elevation of a video camera V, from at least the horizontal (or preferably slightly above) downward through the vertical (or preferably slightly past), without incurring any blockage of the camera lens.

The camera window 140 need not be excessively wide, but need only have sufficient width to provide for the field of view of the camera lens, which lens will be positioned relatively close to the inner surface of the housing camera window 140. The relatively narrow width (on the order of six inches) allows a simple, flat wrapped sheet of durable transparent or clear material (e.g. Lexan, TM ) to be used for the window 140, rather than requiring a more complex, cast or otherwise molded shape having a compound spherical curvature. Thus, the present camera window 140 is relatively inexpensive to produce and to replace, should the need arise.

FIG. 5 is a block diagram, showing the general operation of the present camera platform invention. The camera tilt and pan functions are controlled by a manual control apparatus 146, which is located within the passenger area of the aircraft and is controlled by an operator positioned in the aircraft passenger area. The tilt/pan control apparatus 146 may comprise a control stick having left/right and up/down motions, or other controls as desired. The manual control apparatus 146 serves to actuate both the camera pan (left/right or azimuth motion) motor 58 and the camera tilt (up/down or elevation motion) motor 96, with the motor speeds being further controlled by an adjustable variable speed control 148, if desired. Camera controls 150 providing for focus and focal length of the video camera V, are also located within the passenger area of the aircraft and controlled by the operator. The camera may provide a signal to a video monitor (not shown) located in the passenger area and visible to the camera operator. The entire apparatus is preferably powered by a self contained battery pack 152 within the passenger area, in order to preclude need for use of the existing aircraft electrical system.

The various controls and power supply described immediately above are wired to the remotely located video camera V and pan and tilt motors 58 and 96 by means of conventional wiring harnesses. In the event that an otherwise unequipped aircraft is used in combination with the present invention, the strut attachment bracket 12 may be quickly and easily secured to the wing strut S as shown in FIG. 1, or other aircraft strut, and the wiring harness taped or otherwise secured to the underside of the aircraft wing or downwardly along the strut, to pass into the fuselage and passenger area of the aircraft, e.g. by means of an open or removed cabin window. Thus, the present aircraft video camera platform need not require complex and lengthy paperwork procedures to gain a field approval by an FAA authorized inspector, or a supplemental type certificate, as with systems requiring airframe modification.

Alternatively, an aircraft may be more or less permanently adapted for use with the present video platform, if desired. The strut attachment bracket 12 is secured in the same manner, but the wiring harness may be permanently installed within the aircraft wing structure by means of routing it through an inspection panel located at the strut attachment point to the wing, if desired. Quick disconnect wiring connectors (e.g., cannon plugs or the like) may be used at each end of the permanently installed wiring harness. Thus, the video camera platform apparatus and associated housing may be quickly and easily removed and installed as needed, merely by removing the drive shaft attachment clamps 28 and disconnecting the wiring harness at that point. The controls and battery pack within the aircraft may also be quickly removed from the interior by such quick disconnects, to allow the aircraft to be used for other purposes.

Thus, the present aircraft video camera platform will be seen to provide a readily usable apparatus for spur of the moment airborne video coverage of various events or occurrences, and provide for the temporary attachment to and removal from an existing aircraft without need for extensive disassembly of major aircraft structures or modifications to the aircraft. Some of the components (e.g., the strut attachment bracket 12 and wiring harness to the passenger area of the aircraft) may be left in place, if desired, on an aircraft which is regularly used or assigned to such duties. In either case, the wiring from the camera tilt and pan motors 58 and 96, and from the video camera V, extend upwardly through the hollow driven shaft 34 of the camera platform, where they are temporarily or permanently connected to the remaining wiring harness discussed above. The present invention provides an extremely economical means of acquiring airborne video coverage of events, in comparison to conventional methods using helicopters, blimps and other aircraft with costly operating costs. Moreover, the present camera platform is relatively inexpensive in comparison to earlier devices developed for such costly aircraft, and reduces the economic burden of providing an airborne video camera platform accordingly.

It is to be understood that the present invention is not limited to the sole embodiment described above, but encompasses any and all embodiments within the scope of the following claims.

We claim:

1. A quickly removable and easily installable aircraft video camera mount providing for the installation of a video camera to the wing strut of a high wing airplane, said video camera mount comprising:

a temporarily installable and removable wing strut attachment bracket comprising an elongated plate having an upper end and an opposite lower end and conforming to the exterior shape of the wing strut, with said strut attachment bracket having a strut clamp at said lower end adapted to be secured removably about the wing strut, and a strut attachment bolt at said upper end adapted to pass through an existing tiedown attachment hole of the wing strut to secure said upper end of said strut attachment bracket removably to the wing strut, with said strut attachment bracket further including a tubular pan drive shaft removably affixed directly below said upper end and said strut attachment bolt;

a motorized camera pan bracket rotatably secured beneath said pan drive shaft, providing for panning of a video camera about a generally vertical axis through at least 360 degrees of rotation;

a motorized camera tilt bracket pivotally secured to said camera pan bracket, providing for the tilt of a video camera about a generally horizontal axis and at least from a horizontal through a vertical orientation inclusive, and;

a generally spherical housing rotatably secured beneath said strut attachment bracket and affixed to said camera pan bracket, with said housing generally comprising an upper portion and a lower portion, with said lower portion including a clear window installed therein for a video camera installed within said housing, whereby;

said aircraft video camera mount is removably installable to the wing strut of an existing strut braced high wing aircraft to provide for the temporary operation of the aircraft as an aerial video camera platform, with said motorized camera pan bracket and said motorized camera tilt bracket providing for operation of a video camera installed therein through at least 360 degrees of movement about a vertical axis and more than 90 degrees of movement about a horizontal axis, from the horizontal downwardly through the vertical inclusive.

2. The aircraft video camera mount of claim 1 wherein:

said wing strut attachment bracket includes a channel depending therefrom, with said channel including spaced apart upper and lower U-bolts extending generally horizontally therefrom;

said tubular pan drive shaft including an upper pair and a lower pair of oppositely spaced apart grooves formed laterally therein, with said upper and lower pair of grooves adapted to fit closely respectively between said upper and lower U-bolts, and;

upper and lower clamps adapted to be secured respectively to said upper and lower U-bolts, with said clamps and said U-bolts capturing said tubular pan drive shaft therebetween and said U-bolts passing through said grooves of said tubular pan drive shaft to preclude movement of said tubular support member within said U-bolts.

3. The aircraft video camera mount of claim 1 wherein:

said motorized camera pan bracket includes a generally horizontal central platform portion with a receiver plate attached thereabove, and a concentric tubular camera bracket support shaft affixed to said receiver plate and extending upwardly therefrom, said bracket support shaft having an upper end with a flange extending outwardly therefrom and an opposite lower end, and said bracket support shaft being rotatably captured within said tubular pan drive shaft with said bracket support shaft flange precluding downward passage of said bracket support shaft through said pan drive shaft;

said pan bracket central platform further including a camera pan motor installed thereon with a drive sprocket, and said pan drive shaft having a driven sprocket affixed thereto, with a drive chain extending around said motor drive sprocket and said pan drive shaft driven sprocket to cause said pan motor, said pan bracket, said receiver plate, and said support shaft to rotate relative to said pan drive shaft when said pan motor is actuated.

4. The aircraft video camera mount of claim 3 wherein:

said receiver plate is laterally adjustable relative to said camera pan bracket central platform, thereby providing tension adjustment for said drive chain.

5. The aircraft video camera mount of claim 1 wherein:

said camera tilt bracket includes a central platform portion having a video camera mounting plate mounted thereto by means of resilient vibration absorbing mounts installed between said tilt bracket central platform and said video camera mounting plate.

6. The aircraft video camera mount of claim 1 including:

remote control means providing for the remote operation of camera pan, tilt, and focal length functions by an operator within the aircraft.

7. The aircraft video camera mount of claim 1 including:

electrical power supply means providing electrical power for camera pan, tilt, and focal length functions independently of the aircraft electrical system, thereby precluding need for use of aircraft electrical power.

8. A quickly removable and easily installable aircraft video camera mount providing for the installation of a video camera to an aircraft strut, said video camera mount comprising:

a strut attachment bracket including a tubular pan drive shaft removably affixed thereto and depending generally vertically therefrom, said pan drive shaft having an upper end and an opposite lower end;

a concentric tubular camera bracket support shaft having an upper end with a flange extending outwardly therefrom and an opposite lower end, said support shaft rotatably captured within said drive shaft with said support shaft flange precluding downward passage of said support shaft through said drive shaft;

a motorized camera pan bracket affixed to said lower end of said support shaft and depending therefrom, with said pan bracket comprising a generally horizontal central platform portion and opposite first and second arms depending therefrom, and providing for panning of a video camera about a generally vertical axis through at least 360 degrees of rotation;

a motorized camera tilt bracket pivotally secured to said camera pan bracket, with said tilt bracket comprising a generally horizontal central platform portion and opposite first and second walls extending upwardly therefrom, with said walls fitting between said first and second arms of said camera pan bracket and pivotally disposed therebetween to provide for the tilt of a video camera about a generally horizontal axis and at least from a horizontal through a vertical orientation inclusive, and;

a generally spherical housing rotatably secured beneath said strut attachment bracket and affixed to said camera pan bracket, with said housing generally comprising an upper portion and a lower portion, with said lower portion including a clear window installed therein for a video camera installed within said housing, whereby;

said aircraft video camera mount is removably installable to an existing aircraft strut to provide for the temporary operation of the aircraft as an aerial video camera platform, with said motorized camera pan bracket and said motorized camera tilt bracket providing for operation of a video camera installed therein through at least 360 degrees of movement about a vertical axis and more than 90 degrees of movement about a horizontal axis, from the horizontal downwardly through the vertical inclusive.

9. The aircraft video camera mount of claim 8 wherein:

said strut attachment bracket includes a channel depending therefrom, with said channel including spaced apart upper and lower U-bolts extending horizontally therefrom;

said tubular pan drive shaft including an upper pair and a lower pair of oppositely spaced apart grooves formed laterally therein, with said upper and lower pair of grooves adapted to fit closely respectively between said upper and lower U-bolts, and;

upper and lower clamps adapted to be secured respectively to said upper and lower U-bolts, with said clamps and said U-bolts capturing said tubular pan drive shaft therebetween and said U-bolts passing through said grooves of said tubular pan drive shaft to preclude movement of said tubular support member within said U-bolts.

10. The aircraft video camera mount of claim 8 wherein:

said central platform portion of said motorized camera pan bracket includes a receiver plate attached thereabove, with said concentric tubular camera bracket support shaft affixed to said receiver plate and extending upwardly therefrom;

said pan bracket central platform further including a camera pan motor installed thereon with a drive sprocket, and said pan drive shaft having a driven sprocket affixed thereto, with a drive chain extending around said motor drive sprocket and said pan drive shaft driven sprocket to cause said pan motor, said pan bracket, said receiver, and said support shaft to rotate relative to said pan drive shaft when said pan motor is actuated.

11. The aircraft video camera mount of claim 10 wherein:

said receiver plate is laterally adjustable relative to said camera pan bracket central platform, thereby providing tension adjustment for said drive chain.

12. The aircraft video camera mount of claim 8 wherein:

said central platform portion of said camera tilt bracket includes a video camera mounting plate mounted thereto by means of resilient vibration absorbing mounts installed between said tilt bracket central platform and said video camera mounting plate.

13. The aircraft video camera mount of claim 8 including:

remote control means providing for the remote operation of camera pan, tilt, and focal length functions by an operator within the aircraft.

14. The aircraft video camera mount of claim 8 including:

electrical power supply means providing electrical power for camera pan, tilt, and focal length functions independently of the aircraft electrical system, thereby precluding need for use of aircraft electrical power.

15. A quickly removable and easily installable aircraft video camera mount providing for the installation of a video camera to an aircraft strut, said video camera mount comprising:

a strut attachment bracket including a tubular pan drive shaft removably affixed thereto and depending generally vertically therefrom, said pan drive shaft having an upper end and an opposite lower end;

a motorized camera pan bracket rotatably secured beneath said pan drive shaft, providing for panning of a video camera about a generally vertical axis through at least 360 degrees of rotation;

a motorized camera tilt bracket pivotally secured to said camera pan bracket, providing for the tilt of a video camera about a generally horizontal axis and at least from a horizontal to a vertical orientation inclusive, and;

a generally spherical housing rotatably secured beneath said pan drive shaft and affixed to said camera pan bracket, with said housing generally comprising an opaque upper portion and an opaque lower portion removably secured together along a diagonal circumference, with said lower portion including a narrow, elongate clear window installed therein, with said clear window comprising a flat wrap of clear material having curvature in a single plane and extending from above the horizontal downwardly past the vertical to provide a tilt viewing angle range of more than 90 degrees for a video camera installed therein, whereby;

said aircraft video camera mount is removably installable to an existing aircraft strut to provide for the temporary operation of the aircraft as an aerial video camera platform, with said motorized camera pan bracket and said motorized camera tilt bracket providing for operation of a video camera installed therein through at least 360 degrees of movement about a vertical axis and more than 90 degrees of movement about a horizontal axis, from the horizontal downwardly through the vertical inclusive.

16. The aircraft video camera mount of claim 15 wherein:

said strut attachment bracket includes a channel depending therefrom, with said channel including spaced apart upper and lower U-bolts extending horizontally therefrom;

said tubular pan drive shaft including an upper pair and a lower pair of oppositely spaced apart grooves formed laterally therein, with said upper and lower pair of grooves adapted to fit closely respectively between said upper and lower U-bolts, and;

upper and lower clamps adapted to be secured respectively to said upper and lower U-bolts, with said clamps and said U-bolts capturing said tubular pan drive shaft therebetween and said U-bolts passing through said grooves of said tubular pan drive shaft to preclude movement of said tubular support member within said U-bolts.

17. The aircraft video camera mount of claim 15 wherein:

said motorized camera pan bracket includes a generally horizontal central platform portion with a receiver plate attached thereabove, and a concentric tubular camera bracket support shaft affixed to said receiver plate and extending upwardly therefrom, said bracket support shaft having an upper end with a flange extending outwardly therefrom and an opposite lower end, and said bracket support shaft being rotatably captured within said tubular pan drive shaft with said bracket support shaft flange precluding downward passage of said bracket support shaft through said pan drive shaft;

said pan bracket central platform further including a camera pan motor installed thereon with a drive sprocket, and said pan drive shaft having a driven sprocket affixed thereto, with a drive chain extending around said motor drive sprocket and said pan drive shaft driven sprocket to cause said pan motor, said pan bracket, said receiver, and said support shaft to rotate relative to said pan drive shaft when said pan motor is actuated.

18. The aircraft video camera mount of claim 17 wherein:

said receiver plate is laterally adjustable relative to said camera pan bracket central platform, thereby providing tension adjustment for said drive chain.

19. The aircraft video camera mount of claim 15 including:

remote control means providing for the remote operation of camera pan, tilt, and focal length functions by an operator within the aircraft.

20. The aircraft video camera mount of claim 15 including:

electrical power supply means providing electrical power for camera pan, tilt, and focal length functions independently of the aircraft electrical system, thereby precluding need for use of aircraft electrical power.

* * * * *